US012716652B2

(12) United States Patent
Geissler et al.

(10) Patent No.: US 12,716,652 B2
(45) Date of Patent: Aug. 25, 2026

(54) DEVICE FOR DRYING SEMICONDUCTOR SUBSTRATES

(71) Applicant: Siltronic AG, Munich (DE)

(72) Inventors: Sebastian Geissler, Brand-Erbisdorf (DE); Simon Rothenaicher, Erlbach (DE)

(73) Assignee: SILTRONIC AG, Munich (DE)

( * ) Notice: Subject to any disclaimer, the term of this patent is extended or adjusted under 35 U.S.C. 154(b) by 1085 days.

(21) Appl. No.: 17/785,088

(22) PCT Filed: Nov. 27, 2020

(86) PCT No.: PCT/EP2020/083653
§ 371 (c)(1),
(2) Date: Jun. 14, 2022

(87) PCT Pub. No.: WO2021/121902
PCT Pub. Date: Jun. 24, 2021

(65) Prior Publication Data

US 2023/0019108 A1 Jan. 19, 2023

(30) Foreign Application Priority Data

Dec. 18, 2019 (EP) .................................... 19217353

(51) Int. Cl.
*A47K 10/48* (2006.01)
*F26B 5/00* (2006.01)

(52) U.S. Cl.
CPC ..................................... *F26B 5/00* (2013.01)

(58) Field of Classification Search
CPC ................................ A47K 10/48; F26B 5/00
USPC ............................................. 34/523, 78, 80
See application file for complete search history.

(56) References Cited

U.S. PATENT DOCUMENTS 6,497,785 B2 12/2002 Huang et al.
7,181,863 B2 * 2/2007 Ferrell ................ H10P 72/0408 34/340
2003/0145874 A1 8/2003 Myland
2007/0157951 A1 7/2007 Indley et al.
2010/0078867 A1 4/2010 Nakashima
(Continued)

FOREIGN PATENT DOCUMENTS

CN 1045539 A 9/1990
CN 204655760 U * 9/2015 ............ A61M 25/10
DE 102014207266 A1 10/2015
(Continued)

OTHER PUBLICATIONS

English translation of CN204655760 by PE2E, Apr. 5, 2025.*

*Primary Examiner* — Deming Wan
(74) *Attorney, Agent, or Firm* — LEYDIG, VOIT & MAYER, LTD.

(57) ABSTRACT

A device is for drying disc-shaped substrates. The device has an elongated body having a top surface, a bottom surface, and a circumferential surface. The elongated body has a hole in the top surface forming a channel, which extends to a lower drainage part of the elongated body, and is chamfered having a chamfer depth and a chamfer angle forming an edge between the chamfer and the top surface and forming a conical recess suitable for resting a disc shaped substrate. The chamfer angle is more than 10° and less than 30°. The chamfer depth is more than 6 mm and less than 12 mm.

8 Claims, 1 Drawing Sheet

(56) References Cited

U.S. PATENT DOCUMENTS

| | | | | |
|---|---|---|---|---|
| 2015/0294883 | A1* | 10/2015 | Kuehnstetter | ..... H01L 21/67028<br>34/426 |
| 2016/0201986 | A1 | 7/2016 | Velazquez et al. | |

FOREIGN PATENT DOCUMENTS

| | | | |
|---|---|---|---|
| EP | 0385536 | A1 | 9/1990 |
| JP | 2004296552 | A | 10/2004 |
| JP | 2015222754 | A | 12/2015 |

* cited by examiner

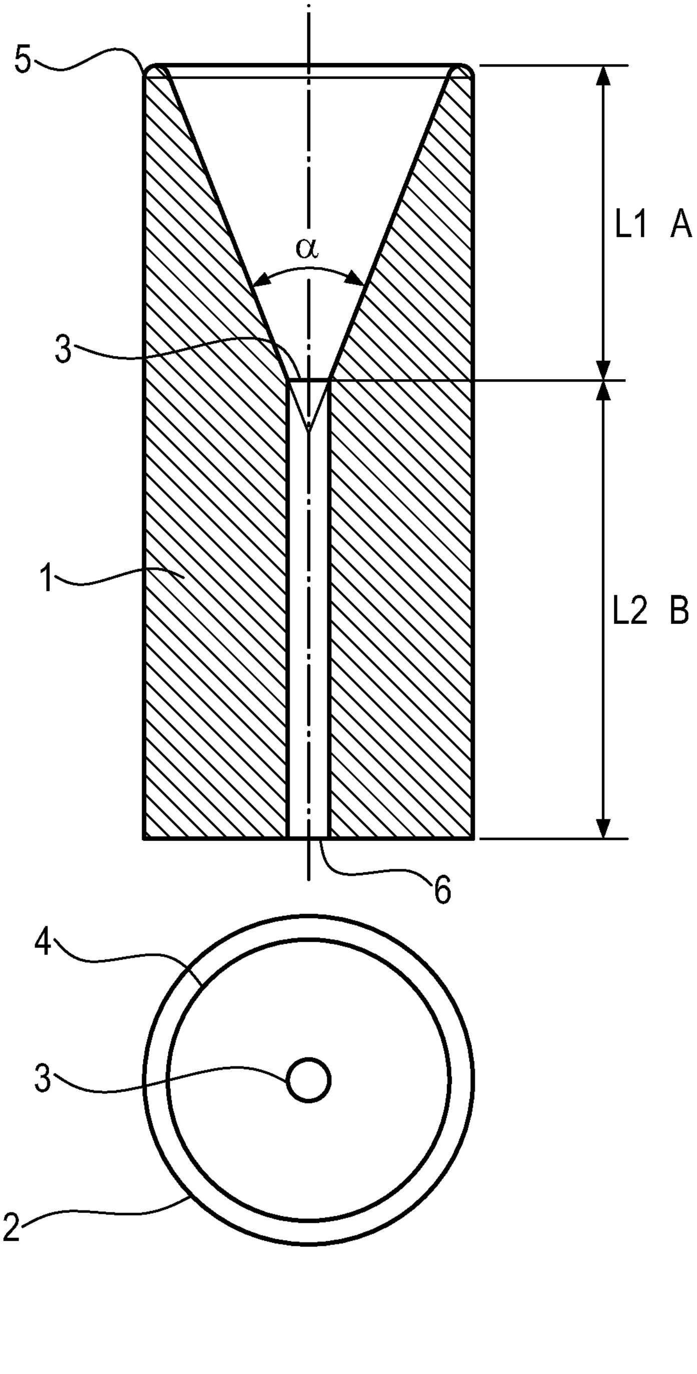
5
α
L1 A
3
1
L2 B
6
4
3
2

DEVICE FOR DRYING SEMICONDUCTOR SUBSTRATES

CROSS REFERENCE TO RELATED APPLICATIONS

This application is a U.S. National Phase application under 35 U.S.C. § 371 of International Application No. PCT/EP2020/083653, filed on Nov. 27, 2020, and claims benefit to European Patent Application No. EP 19217353.2, filed on Dec. 18, 2019. The International Application was published in English on Jun. 24, 2021 as WO 2021/121902 A1 under PCT Article 21(2).

FIELD

The present disclosure relates to a device for use in drying disc-shaped semiconductor substrates.

BACKGROUND

The present disclosure relates to a method that may be used, for example, in the manufacture of electric circuits on all kinds of substrates, such as, for example, integrated circuits on semiconductor wafers (for example of silicon), drives for liquid crystal displays on transparent plates of glass or quartz or circuits on plates of synthetic material (circuit boards). The method may also be used in the manufacture of shadow masks for television picture tubes or in the manufacture of CD or VLP records. In all these cases, the substrates are immersed many times for some time in a bath containing a liquid, for example in galvanic baths for deposition of metals, in etching baths for etching patterns into metal layers or into semiconductor material, in development baths for developing exposed photo lacquer layers and in rinsing baths for cleaning the substrates. After treatment in the liquid baths, the substrates are taken from the liquid and are dried. The substrates can be taken from the liquid in that they are lifted or withdrawn from the liquid, but of course also in that the liquid is caused to flow out of the bath.

While being taken from the bath, the semiconductor wafer resides on a device that is used to hold the semiconductor wafer in place. During this process, a problem can arise in that residues of liquid remain at the edge of the substrate. This can lead to unwanted particles on the edge of the substrate, which are later on effecting the quality of the semiconductor wafer.

The physical effect utilized thereby are described in CN1045539 A (EP 03 855 36 A1), as is an apparatus which is to some extent suitable for conduction of the method.

A device and a method to improve the quality of cleaning in respect to remaining particles of the semiconductor wafer is given in DE 10 2014 207 266 A1. However, using this there are still particles left that reduce the quality of the semiconductor wafers.

SUMMARY

In an embodiment, the present disclosure provides a device that is for drying disc-shaped substrates. The device has an elongated body having a top surface, a bottom surface, and a circumferential surface. The elongated body has a hole in the top surface forming a channel, which extends to a lower drainage part of the elongated body, and is chamfered having a chamfer depth and a chamfer angle forming an edge between the chamfer and the top surface and forming a conical recess suitable for resting a disc shaped substrate. The chamfer angle is more than 10° and less than 30°. The chamfer depth is more than 6 mm and less than 12 mm.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 shows a device (disc holder) according to an aspect of the present disclosure.

DETAILED DESCRIPTION

The present disclosure relates to a device being used to treat semiconductor wafers, in which the latter are immersed for some time in a bath containing a liquid and are then taken therefrom so slowly that practically the whole quantity of liquid remains in the bath.

Aspects of the present disclosure improve such a device, and reduce the number of particles, which are found on the dried substrates, by using this improved device.

The device comprises an elongated body (1) having a top surface, a bottom surface and a circumferential surface.

A hole in the top surface forms a channel (6) which extends to a lower drainage part (B) of the elongated body (1).

The hole in the top surface is chamfered having a chamfer depth (L1) and a chamfer angle (α). The chamfer depth defines a funnel region of the device. An edge is formed between the chamfer and the top surface, which is preferably edge-rounded (5). This forms a conical recess suitable a disc shaped substrate to rest on.

The said chamfer angle is preferably not more than 60° and not less than 10° and that the chamfer depth (L1) is preferably not more than 15 mm and not less than 7 mm.

Preferably, the device is made from ceramic filled polyetheretherketone (CFM PEEK).

More preferably, the diameter of a channel is not less than 0.5 mm and not more than 3 mm. Preferably the diameter is not less than 0.8 mm and not more than 1.2 mm.

More preferably, the length of the channel (L2) is not less than 5 mm and not more than 20 mm.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

A Funnel region of the elongated body
B Drainage part of the elongated body
L1 Height of the wedge formed on top of the elongated body
L2 Height of the drainage part
1 Elongated body
2 Diameter of the elongated body.
3 Hole
4 Chamfering diameter of the elongated body.
5 Rounded edge formed between the chamfer and the top surface.
6 Channel extending a hole in the top surface to the lower surface.
α Opening angle of the wedge, angle between two surfaces and an upper edge

The invention claimed is:

1. A device for drying disc-shaped substrates, the device comprising:

an elongated body having a top surface, a bottom surface, and a circumferential surface, the elongated body comprising a hole in the top surface forming a channel, which extends to a lower drainage part of the elongated body, and is chamfered having a chamfer depth and a chamfer angle forming an edge between the chamfer and the top surface and forming a conical recess configured to rest a disc shaped substrate, wherein the chamfer angle is more than 100 and less than 30°, and wherein the chamfer depth (L1) is more than 6 mm and less than 12 mm.

2. The device according to claim 1, wherein the device comprises ceramic filled polyetheretherketone (CFM PEEK).

3. The device according to claim 1, wherein the edge between the chamfer and the top surface is rounded with a radius not more than 0.1 mm and not less than 1 mm.

4. The device according to claim 1, wherein the diameter of the channel is not less than 0.5 mm and not more than 3 mm.

5. The device according to claim 1, wherein a length of the channel is not less than 30 mm.

6. The device according to claim 1, wherein the diameter of the channel is not less than 0.8 mm and not more than 1.2 mm.

7. A method for treating a semiconductor wafer that is in the form of the disc-shaped substrate, the method comprising:

resting the disc-shaped substrate on the device configured according to claim 1;

immersing the disc-shaped substrate with the device in a bath containing liquid; and removing the disc-shaped substrate with the device from the bath.

8. The device according to claim 1, wherein the chamfer depth defining a funnel region of the device.

* * * * *